US009053271B1

(12) United States Patent
Gupta et al.

(10) Patent No.: US 9,053,271 B1
(45) Date of Patent: Jun. 9, 2015

(54) INTEGRATED CIRCUIT RESET SYSTEM MODIFICATION TOOL

(71) Applicants: Deep Gupta, Noida (IN); Puneet Dodeja, Delhi (IN); Arvind Garg, Chandigarh (IN); Pankaj K. Jha, Chandigarh (IN)

(72) Inventors: Deep Gupta, Noida (IN); Puneet Dodeja, Delhi (IN); Arvind Garg, Chandigarh (IN); Pankaj K. Jha, Chandigarh (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 0 days.

(21) Appl. No.: 14/173,822

(22) Filed: Feb. 6, 2014

(51) Int. Cl.
*G06F 17/50* (2006.01)

(52) U.S. Cl.
CPC .................................. *G06F 17/505* (2013.01)

(58) Field of Classification Search
USPC ........................................................ 716/100
See application file for complete search history.

(56) References Cited

U.S. PATENT DOCUMENTS

| 7,343,569 | B1 | 3/2008 | Lam et al. | |
|---|---|---|---|---|
| 7,594,211 | B1 | 9/2009 | Tian et al. | |
| 7,626,420 | B1 * | 12/2009 | Cohen | 326/46 |
| 8,443,315 | B2 | 5/2013 | Manohar et al. | |
| 8,578,306 | B2 | 11/2013 | Manohararajah | |
| 2003/0020524 | A1 * | 1/2003 | Ehmann | 327/142 |
| 2009/0055781 | A1 * | 2/2009 | Araya | 716/3 |
| 2012/0180012 | A1 * | 7/2012 | Manohar et al. | 716/103 |
| 2013/0113531 | A1 * | 5/2013 | Luedeke et al. | 327/142 |

FOREIGN PATENT DOCUMENTS

WO          9962173           12/1999

* cited by examiner

*Primary Examiner* — Paul Dinh
*Assistant Examiner* — Bryce Aisaka
(74) *Attorney, Agent, or Firm* — Charles Bergere (57) ABSTRACT

An electronic design automation (EDA) tool that analyzes a circuit design to identify sequential elements (flip-flops) that do not need to be reset, for example, because they do not need to be initialized in order to be in a known state, and converts the identified sequential elements to non-resettable circuits, which saves power and area.

19 Claims, 5 Drawing Sheets

INTEGRATED CIRCUIT RESET SYSTEM MODIFICATION TOOL

BACKGROUND OF THE INVENTION

The present invention relates generally to integrated circuit design tools, and, more particularly, to a tool for modifying an initialization (reset) scheme of an integrated circuit.

An integrated circuit design that includes a large number of logic gates and sequential elements such as flip-flops and latches generally has a specific initialization scheme. The initialization scheme places the circuit design into a known state for simulation, since the elements of the circuit design cannot self-initialize. For example, an initialization scheme for a sequential element may involve either setting or resetting the sequential element. The initialization scheme can be applied during power up, at the beginning of simulation, or during operation of the circuit design simulation.

Many design parameters are considered before choosing an appropriate initialization scheme, such as the kind and implementation of the initialization scheme using the available resources, and so on, and then a computer-aided-design (CAD) tool or an electronic-design-automation (EDA) tool is used to implement the chosen initialization scheme.

The initialization scheme can be either synchronous or asynchronous and is implemented using synchronous or asynchronous resettable sequential elements, or combinations thereof. The asynchronous resettable sequential elements are initialized with an external asynchronous initialization signal, whereas, the synchronous resettable sequential elements receive the initialization signal through their data inputs when the clock terminal receives an input clock. The initialization signal may set or reset the sequential elements. The asynchronously resettable sequential elements reset instantaneously independent of the input clock. For proper operation of the integrated circuit design, all of the asynchronous resettable sequential elements must receive the external asynchronous initialization signal within one cycle of the input clock, thus posing a low skew requirement.

However, as integrated circuit designs become more complex, the level of hierarchies and the fan-outs of the sequential elements increases, which make it difficult to meet the skew rate requirements by simply using asynchronously resettable sequential elements. In such cases, reset-buffer trees are implemented to meet the skew rate requirements. The reset buffer trees are pipelined with binary values corresponding to initial states of the asynchronously resettable sequential elements. However, implementation of the reset-buffer trees results in increases in area and power consumption.

Further, the asynchronously resettable sequential elements may be sensitive to glitches and are larger (in size) than synchronously resettable flip-flops. Hence, for a large and complex integrated circuit design, it is preferable to have more synchronously resettable sequential elements. Therefore, it would be advantageous to have a system and method for modifying an integrated circuit design by replacing asynchronously resettable sequential elements with synchronously resettable sequential elements.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION OF THE INVENTION

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a method for modifying an initialization scheme of an integrated circuit design using an electronic design automation (EDA) tool is provided. The integrated circuit design includes a plurality of sequential elements having predefined initial states. The plurality of sequential elements is asynchronously initialized using an asynchronous initialization signal. The EDA tool includes a memory and a processor in communication with the memory. The memory stores the integrated circuit design. The processor identifies a first set of sequential elements of the plurality of sequential elements, where each sequential element of the first set receives at least one of an external input signal and the asynchronous initialization signal by way of a combinational logic circuit. The processor places a binary value at an output terminal of each of the sequential elements of the first set. The binary value corresponds to a predefined initial state of the corresponding sequential element of the first set. The processor identifies a second set of sequential elements of the plurality of sequential elements such that at least one of the sequential elements of the second set receives the binary value from a corresponding sequential element of the first set. The processor determines present states of each of the sequential elements of the second set and identifies or defines a third set of sequential elements from the sequential elements of the second set (that is, the third set is a subset of the second set). The determined present state of each sequential element of the third set matches a predefined initial state thereof. The processor then replaces each sequential element of the third set with a sequential element that is configured to be initialized synchronously. Thus, the integrated circuit design is modified. In various embodiments of the present invention, an integrated circuit is fabricated using the modified integrated circuit design.

Various embodiments of the present invention provide a system and method for modifying an initialization scheme of an integrated circuit design using an EDA tool. The integrated circuit design includes a plurality of sequential elements that have pre-defined initial states and are initialized using an asynchronous initialization signal. A processor of the EDA tool identifies a first set of sequential elements of the plurality of sequential elements such that each sequential element thereof receives either an external input signal or the asynchronous initialization signal by way of a combinational logic circuit. The processor places a binary value at an output terminal of each of the sequential elements of the first set that corresponds to a predefined initial state thereof. The processor identifies a second set of sequential elements of the plurality of sequential elements where at least one of the sequential elements of the second set receives the binary value from a corresponding sequential element of the first set. The processor further identifies a present state of each of the sequential elements of the second set and compares the present sate with a predefined initial state thereof. The processor defines a third set of sequential elements from the second set of sequential elements such that for each element of the third set a present state matches a predefined initial state thereof. The processor then replaces each sequential element of the third set with a sequential element that is configured to initialize synchronously. Next, the processor places a binary value at an output terminal of each of the sequential elements of the second set that receive a deterministic binary value at a data input terminal thereof and repeats the above-mentioned steps until all the asynchronously initialized sequential elements of the integrated circuit design satisfying the above-mentioned conditions are replaced with synchronously resettable sequential elements. Replacing the asynchronously resettable sequential elements with synchronously resettable sequential elements eases routing in the integrated circuit design as the synchronously resettable sequential elements do not have reset pins. The number of reset buffer trees in the integrated circuit design also decreases with the modification. The system of the present invention reduces area and power consumption of a chip on which the integrated circuit design is implemented. The system further reports the percentage of sequential elements that are converted from an asynchronous initialization scheme to a synchronous initialization scheme for each iteration of the method. The system also can be used to determine the total number of clock cycles for which the reset signal must be asserted so that a fair trade-off between reduction in area of the chip and the time required to initialize the integrated circuit design can be made.

Figure 1:
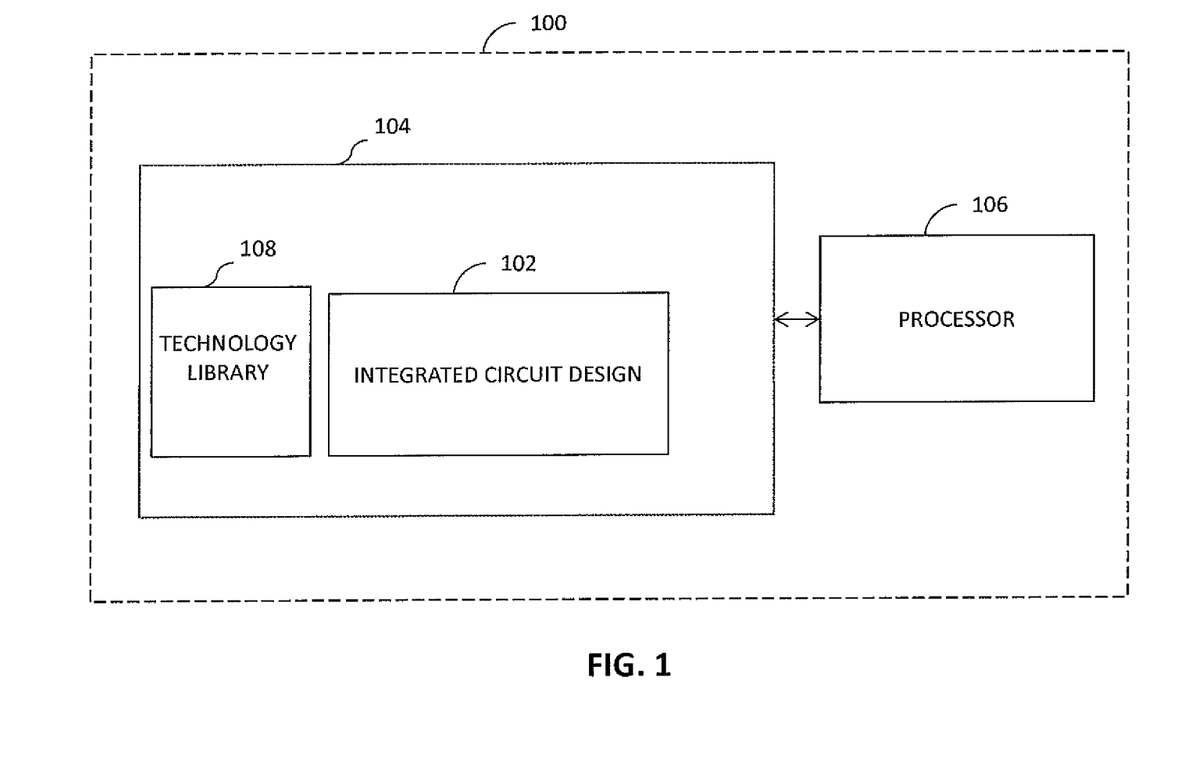
FIG. 1 is a schematic block diagram of an electronic design automation (EDA) tool for modifying an initialization scheme of an integrated circuit design in accordance with an embodiment of the present invention.

Referring now to FIG. 1, a schematic block diagram of an electronic design automation (EDA) tool 100 for modifying an initialization scheme of an integrated circuit design 102 in accordance with an embodiment of the present invention is shown. The EDA tool 100 includes a memory 104 and a processor 106 in communication with the memory 104. The memory 104 includes a technology library 108. The memory 104 receives and stores the integrated circuit design 102. The integrated circuit design 102 may include any circuit design that includes digital logic elements, sequential elements, or a combination thereof. Examples of digital logic elements include AND gates, OR gates, NOT gates, NOR gates, NAND gates, XOR gates, XNOR gates, multiplexers, demultiplexers and/or combinational logic circuits that include combinations of the above-mentioned gates. Examples of sequential elements include flip-flops, latches, and shift-registers. The technology library 108 stores instances of the sequential elements and digital logic elements.

The processor 106 and memory 104 comprise a computer system that can range from a stand-alone personal computer to a network of processors and memories, to a mainframe system. The computer system must be able to run verification and computer aided design tools that can simulate and implement digital and analog circuits, such as Incisive™ Unified Simulator (IUS) and Encounter Digital Implementation (EDI) by Cadence Design Systems, Inc. Such tools and computer systems are known to those of skill in the art. The integrated circuit design 102 may comprise a microprocessor, microcontroller unit (MCU), system-on-chip (SOC), application specific integrated circuit (ASIC), etc.

Figure 2A:
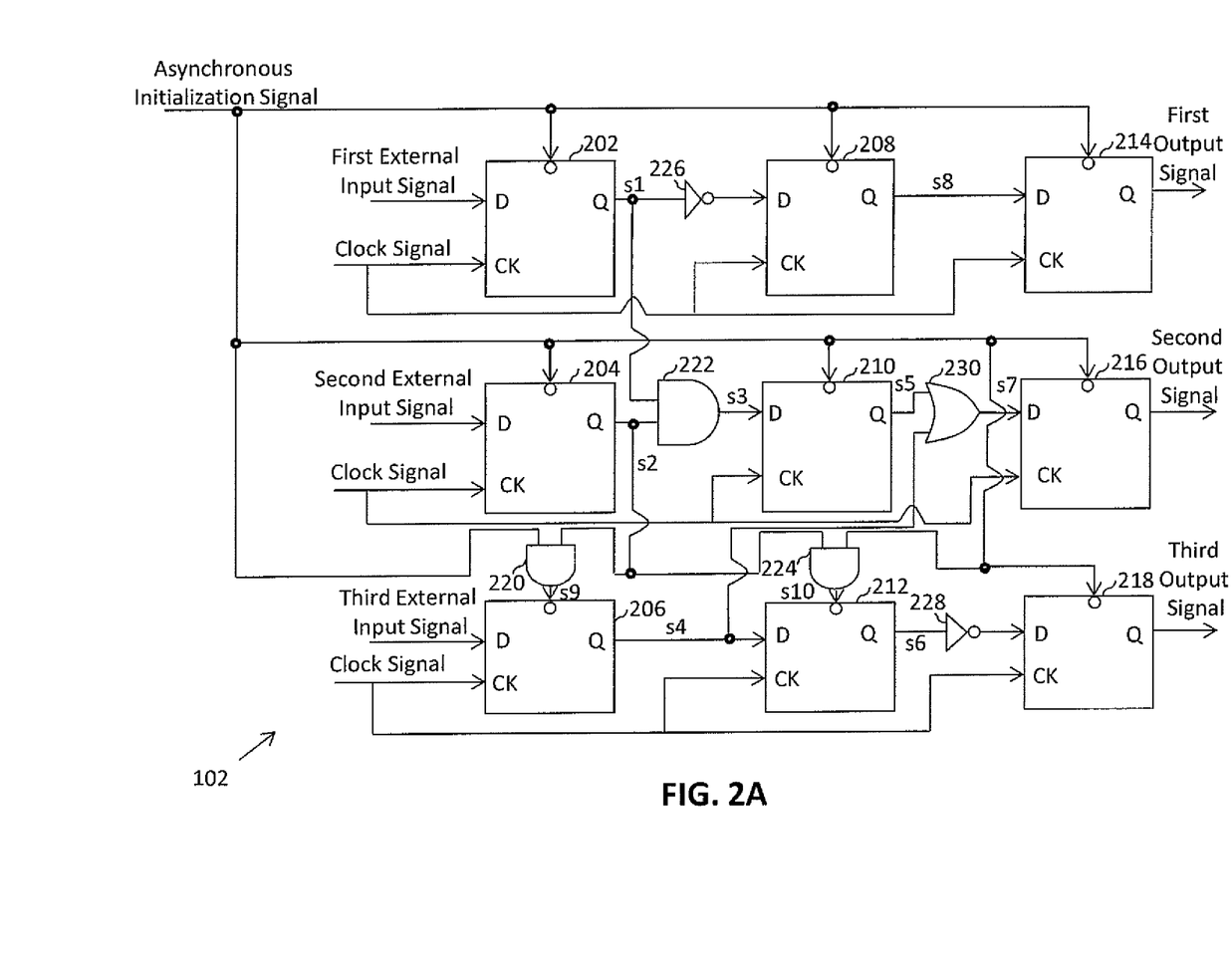
FIG. 2A is a schematic block diagram of an exemplary initial integrated circuit design in accordance with an embodiment of the present invention.

FIG. 2A is a schematic block diagram of an example of the integrated circuit design 102, in accordance with an embodiment of the present invention. The integrated circuit design 102 includes first through ninth D flip-flops 202-218, which are initialized asynchronously, first through third AND gates 220-224, first and second NOT gates 226 and 228, and an OR gate 230. The first D flip-flop 202 has a data input terminal connected to an external source (not shown) for receiving a first external input signal, a clock terminal connected to a clock source (not shown) for receiving a clock signal, a reset terminal for receiving an asynchronous initialization signal, and an output terminal for outputting a signal s1. The second D flip-flop 204 has a data input terminal connected to the external source for receiving a second external input signal, a clock terminal connected to the clock source for receiving the clock signal, a reset terminal for receiving the asynchronous initialization signal, and an output terminal for outputting a signal s2.

The first AND gate 220 has a first input terminal for receiving the asynchronous initialization signal, a second input terminal connected to the second D flip-flop 204 for receiving the signal s2, and an output terminal for outputting a signal s9. The third D flip-flop 206 has a data input terminal connected to the external source for receiving a third external input signal, a clock terminal connected to the clock source for receiving the clock signal, a reset terminal connected to the output terminal of the first AND gate 220 for receiving the signal s9, and an output terminal for outputting a signal s4. The first NOT gate 226 is connected to the output terminal of the first D flip-flop 202 and receives and inverts the signal s1.

The fourth D flip-flop 208 has a data input terminal connected to the first NOT gate 226 for receiving the inverted signal s1, a clock terminal connected to the clock source for receiving the clock signal, a reset terminal for receiving the asynchronous initialization signal, and an output terminal for outputting a signal s8. The second AND gate 222 has a first input terminal connected to the output terminal of the first D flip-flop 202 for receiving the signal s1, a second input terminal connected to the output terminal of the second D flip-flop 204 for receiving the signal s2, and an output terminal for outputting a signal s3. The fifth D flip-flop 210 has a data input terminal connected to the output terminal of the second AND gate 222 for receiving the signal s3, a clock terminal connected to the clock source for receiving the clock signal, a reset terminal for receiving the asynchronous initialization signal, and an output terminal for outputting a signal s5.

The third AND gate 224 has a first input terminal for receiving the asynchronous initialization signal, a second input terminal connected to the second D flip-flop 204 for receiving the signal s2, and an output terminal for outputting a signal s10. The sixth D flip-flop 212 has a data input terminal connected to the output terminal of the third D flip-flop 206 for receiving the signal s4, a clock terminal connected to the clock source for receiving the clock signal, a reset terminal connected to the output terminal of the third AND gate 224 for receiving the signal s10, and an output terminal for outputting a signal s6.

The seventh D flip-flop 214 has a data input terminal connected to the output terminal of the fourth D flip-flop 208 for receiving the signal s8, a clock terminal connected to the clock source for receiving the clock signal, a reset terminal for receiving the asynchronous initialization signal, and an output terminal for outputting a first output signal. The OR gate 230 has a first input terminal connected to the output terminal of the fifth D flip-flop 210 for receiving the signal s5, a second input terminal connected to the output terminal of the third D flip-flop 206 for receiving the signal s4, and an output terminal for outputting a signal s7.

The eighth D flip-flop 216 has a data input terminal connected to the output terminal of the OR gate 230 for receiving the signal s7, a clock terminal connected to the clock source for receiving the clock signal, a reset terminal for receiving the asynchronous initialization signal, and an output terminal for outputting a second output signal. The second NOT gate 228 is connected to the output terminal of the sixth D flip-flop 212 and receives and inverts the signal s6. The ninth D flip-flop 218 has an input terminal connected to the second NOT gate 228 for receiving the inverted signal s6, a clock terminal connected to the clock source for receiving the clock signal, a reset terminal for receiving the asynchronous initialization signal, and an output terminal for outputting a third output signal.

In operation, the processor 106 modifies an asynchronous initialization scheme of the integrated circuit design 102. The processor 106 applies the modification at a gate-level netlist stage during pre-layout simulation of the integrated circuit design 102, thus the integrated circuit design 102 RTL may remain unaltered. The asynchronous initialization scheme makes the integrated circuit design 102 resettable. The processor 106 identifies the sequential elements from each level of the integrated circuit design 102 that can be initialized synchronously using an existing data path structure (signals s1 to s8) of the integrated circuit design 102. The sequential elements are selected sequentially in a number of cycles that corresponds to a total number of levels of the integrated circuit design 102. The modification of the initialization scheme from asynchronous to synchronous makes the integrated circuit design 102 non-resettable. Any sequential element of the integrated circuit design 102 across the plurality of levels that has both set and reset terminals, does not have either of the set and reset terminals, or is initialized by an internally generated initialization signal are excluded by the processor 106 from modification of the initialization scheme. In the first cycle, the processor 106 identifies a first set of sequential elements of the integrated circuit design 102 by excluding all sequential elements that satisfy any one of the above-mentioned conditions.

Any asynchronously resettable sequential element that either receives the external input signal at a corresponding data input terminal or receives the asynchronous initialization signal by way of a combinational logic circuit is placed in the first set. However, if a sequential element receives the asynchronous initialization signal by way of a combinational logic circuit such that the sequential element is initialized independent of a logic state of the asynchronous initialization signal, that sequential element is excluded from the first set. Thus, the sequential elements that receive the asynchronous initialization signal by way of a combinational logic circuit and are initialized independently by the asynchronous initialization signal only are placed in the first set.

The processor 106 then identifies a second set of sequential elements that includes all the sequential elements of the integrated circuit design 102 that constitute a fan-out cone of the first set. The processor 106 applies (i.e., simulates) binary values at the output terminals of the sequential elements of the first set. The binary values correspond to predefined initial states of the first set and are supposed to initialize the second set. The processor 106 determines a present state of each sequential element of the second set. The processor 106 then identifies a third set of sequential elements from the second set, such that, present states of each sequential element of the third set match corresponding pre-defined initial states. While defining the third set, the processor excludes the sequential elements from the first set, even if they satisfy the above-mentioned conditions. Additionally, a sequential element satisfying the above-mentioned condition and receiving the asynchronous initialization signal by way of a combinational logic circuit is also excluded from the third set. The processor 106 replaces each sequential element of the third set with a sequential element that is configured to be initialized synchronously by fetching instances of synchronously initialized sequential elements from the technology library 108.

In the second cycle, the processor 106 places binary values at the output terminals of the sequential elements of the second set that receive deterministic binary values at corresponding data input terminals. The binary values correspond to pre-defined initial states of the sequential elements of the second set. The processor 106 then defines the fourth set of sequential elements by selecting all the sequential elements that constitute a fan-out cone of the sequential elements of the second set. The processor 106 determines a present state of each sequential element of the fourth set. The processor 106 then identifies a fifth set of sequential elements from the fourth set such that present states of each sequential element of the fifth set match corresponding pre-defined initial states. While defining the fifth set, the processor 106 excludes the sequential elements from the second set, even if they satisfy the above-mentioned conditions. Additionally, a sequential element satisfying the above-mentioned condition and receiving the asynchronous initialization signal by way of a combinational logic circuit also is excluded from the fifth set. The processor 106 replaces each sequential element of the fifth set with a sequential element that is configured to be initialized synchronously by fetching instances of synchronously initialized sequential elements from the technology library 108. The processor 106 continues to modify the initialization scheme of the integrated circuit design 102 until the total number of cycles is complete (i.e., until COUNT=0 or at a predetermined stop point, as discussed in more detail below).

Figure 2B:
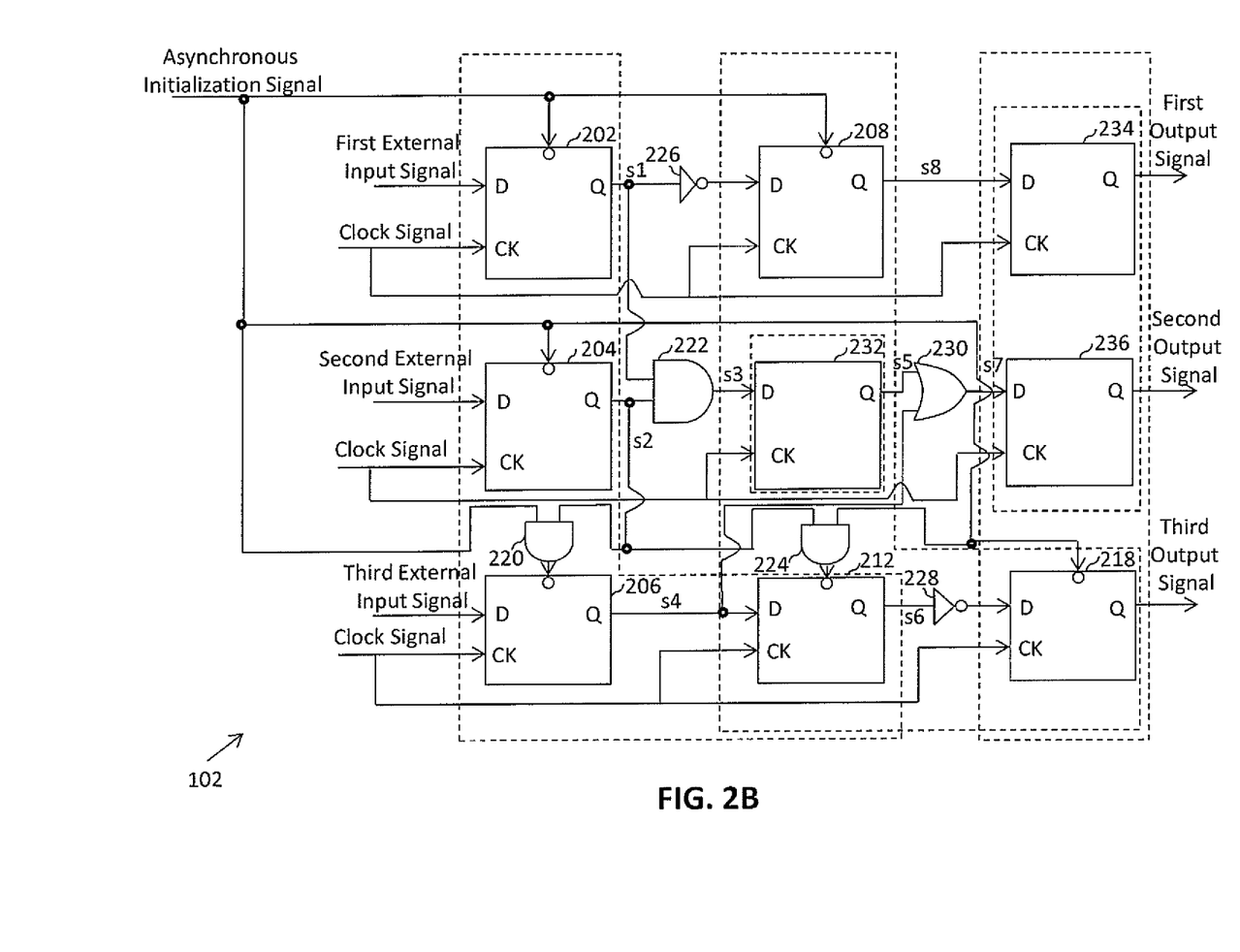
FIG. 2B is a schematic block diagram of the circuit design of FIG. 2A after being modified by the EDA tool of FIG. 1.

In the current example, the first through ninth D flip-flops 202-218 are initialized with the asynchronous initialization signal. The asynchronous initialization signal either sets or resets the first through ninth D flip-flops 202-218. The processor 106 defines the first set as the first through third D flip-flops 202-206 and the sixth D flip-flop 212 (as shown in FIG. 2B) because the first through third D flip-flops 202-206 receive the first through third external input signals at corresponding data input terminals and the third and sixth D flip-flops 206 and 212 receive the asynchronous initialization signal at corresponding reset terminals by way of the first and third AND gates 220 and 224 (i.e., combinational logic circuits), respectively. The third and sixth D flip-flops 206 and 212 are initialized only when the asynchronous initialization signal is at a logic high state, thus being independently initialized by the asynchronous initialization signal.

The processor 106 then defines the second set as the fourth through sixth D flip-flops 208-212 and the ninth D flip-flop 218, which form the fan-out cone of the sequential elements of the first set (as shown in FIG. 2B). The processor 106 applies binary values at the output terminals of the first through third D flip-flops 202-206 and the sixth D flip-flop 212 (the first set). The binary values are supposed to initialize the fourth through sixth D flip-flops 208-212 and the ninth D flip-flop 218 (the second set). The processor 106 compares a present state of each sequential element of the second set with a predefined initial state thereof.

The fourth D flip-flop 208 receives a corresponding toggled binary value at its data input terminal by way of the first NOT gate 226, and therefore, is not initialized to the corresponding pre-defined initial state. The fifth D flip-flop 210 receives a corresponding binary value at its data input terminal by way of the second AND gate 222, which may independently initialize the fifth D flip-flop 210 to a corresponding predefined initial state. The processor 106 then defines the third set to include the fifth D flip-flop 210 from the second set (as shown in FIG. 2B). The sixth D flip-flop 212 receives the asynchronous initialization signal by way of the third AND gate 224 and hence, is not placed in the third set. The ninth D flip-flop 218 receives a corresponding toggled binary value at its data input terminal by way of the second NOT gate 228 and therefore is not initialized to a corresponding pre-defined initial state, and hence, is not placed in the third set. The processor 106 replaces the asynchronously initialized fifth D flip-flop 210 of the third set with a D flip-flop 232 that is configured to be initialized synchronously, as shown in FIG. 2B.

In a next cycle, the processor 106 places binary values at the output terminals of the sequential elements of the second set (i.e., the fourth through sixth D flip-flops 208-212 and the ninth D flip-flop 218) as they receive deterministic binary values at their data input terminals. The processor 106 then defines a fourth set of sequential elements to include the seventh through ninth D flip-flops 214-218, which constitute the fan-out cone of the second set (as shown in FIG. 2B). The binary values are supposed to initialize the seventh through ninth D flip-flops 214-218 (the fourth set). The processor 106 compares a present state of each sequential element of the fourth set with a predefined initial state thereof.

The seventh D flip-flop 214 receives a corresponding binary value at its data input terminal and therefore may get initialized to a corresponding pre-defined initial state. The eighth D flip-flop 216 receives a corresponding binary value at its data input terminal by way of the OR gate 230, which may independently initialize the eighth D flip-flop 216 to a corresponding predefined initial state. The processor 106 then defines the fifth set to include the seventh and eighth D flip-flops 214 and 216 from the fourth set (as shown in FIG. 2B). The ninth D flip-flop 218 receives a corresponding toggled binary value at its data input terminal by way of the second NOT gate 228 and therefore is not initialized to its corresponding pre-defined initial state, and hence, is not placed in the fifth set. The processor 106 replaces the asynchronously initialized seventh and eighth D flip-flops 214 and 216 of the fifth set with D flip-flops 234 and 236, respectively, which are configured to be initialized synchronously, as shown in FIG. 2B.

On replacing the asynchronously initialized fifth, seventh, and eighth D flip-flops 210, 214 and 216 with the synchronously initialized D flip-flops 232, 234 and 236, respectively, the integrated circuit design 102 can be initialized in three clock cycles of the clock signal as compared to one clock cycle of the clock signal before the modification. The integrated circuit design 102 requires the asynchronous initialization signal to remain asserted for three clock cycles, as the initialization of the synchronously initialized D flip-flops 232, 234, and 238 depends on a rising or falling edge of the clock signal. The processor 106 reports a percentage of sequential elements that are converted from asynchronous initialization scheme to synchronous initialization scheme in each cycle. The process may be stopped at any stage, based on the percentage of conversion, such that the design 102 can be reset within a certain number of clock cycles. This allows for a fair trade-off between the number of cycles of the clock signal for which the asynchronous initialization signal is asserted and the reduction in circuit area.

For example, if the integrated circuit design 102 has ten flip-flop levels, on modification of the initialization scheme, ten clock cycles of the clock signal ideally are required to reset the entire integrated circuit design 102. However, the processor 106 can be restricted from modifying the integrated circuit design 102 to a particular level (from 1 to 10) based on a requirement of chip area reduction.

Figure 3A:
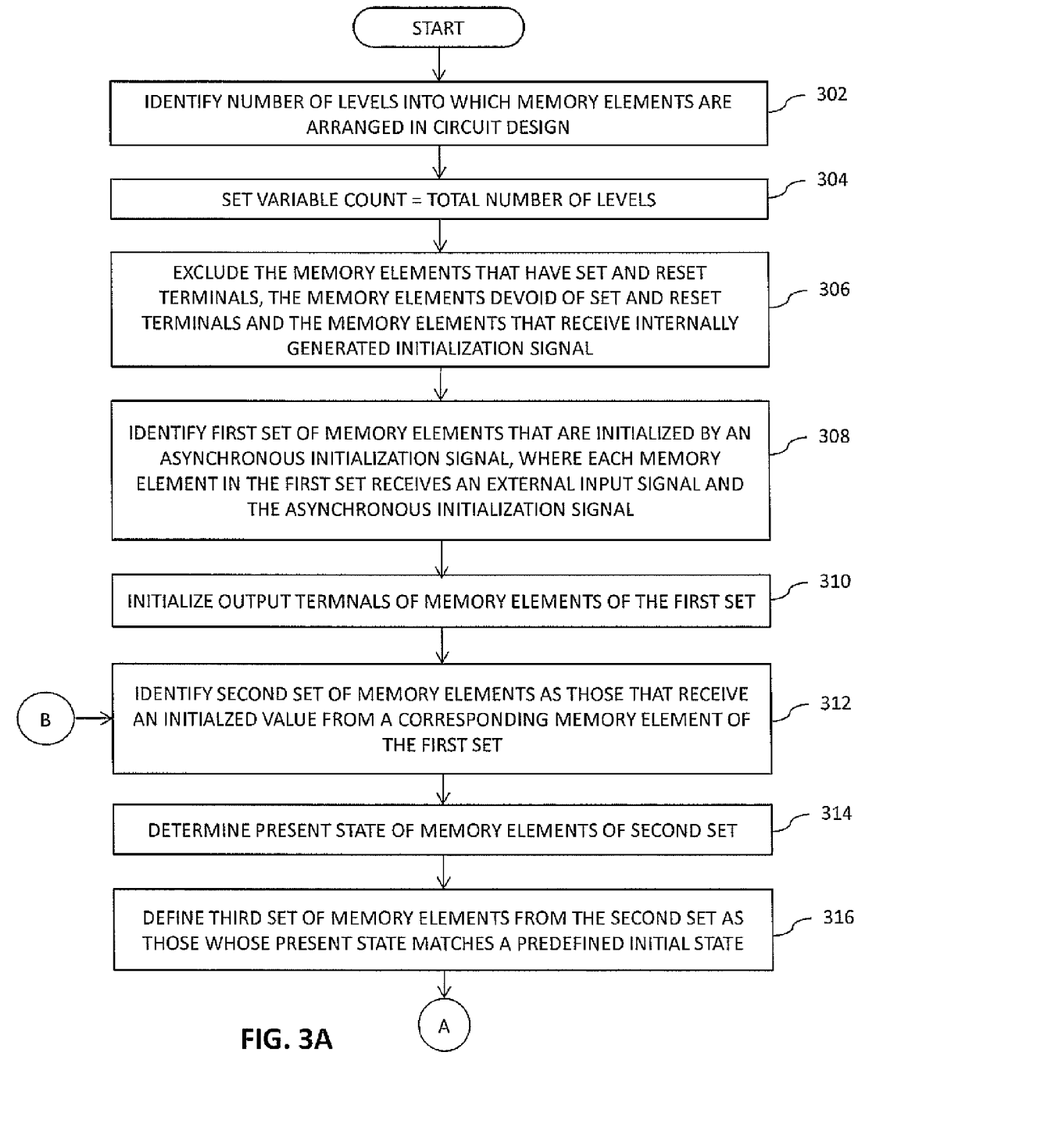
FIGS. 3A and 3B are a flowchart illustrating a method for modifying an initialization scheme of an integrated circuit design in accordance with an embodiment of the present invention.
Figure 3B:
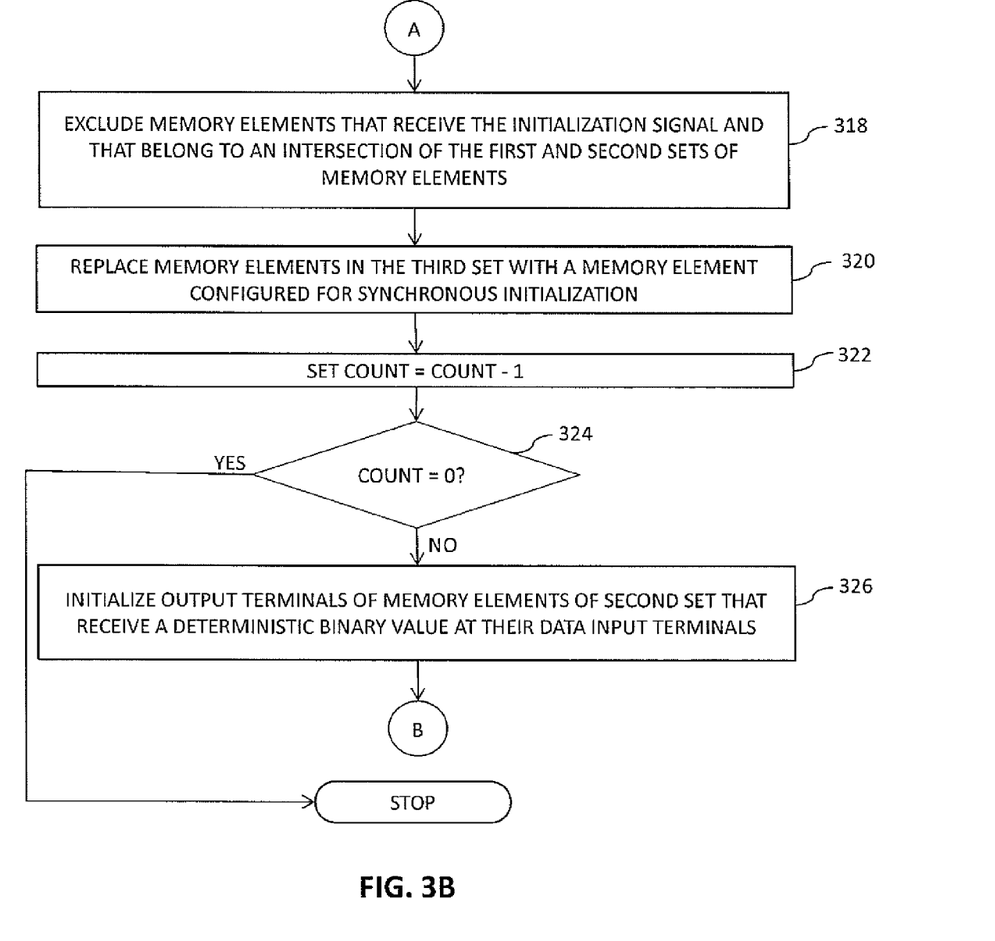

Referring now to FIGS. 3A and 3B, a flow chart illustrating a method for modifying an initialization scheme of the integrated circuit design 102, in accordance with an embodiment of the present invention, is shown. The steps of FIGS. 3A and 3B are similar to, and have been explained in conjunction with FIGS. 2A and 2B. The integrated circuit design 102 is an input to the EDA tool 100 and, for example, is represented by the schematic block diagram of FIG. 2A. At step 302, the processor 106 identifies the total number of levels of sequential elements in the integrated circuit design 102. At step 304, the processor 106 sets a variable COUNT equal to one less than the total number of levels identified. At step 306, the processor 106 excludes from the modification process the sequential elements that have set and reset terminals, the sequential elements that do not have both the set and reset terminals, and the sequential elements that receive an internally generated initialization signal.

At step 308, the processor 106 identifies or defines the first set of sequential elements as those sequential elements that are initialized by the asynchronous initialization signal. Each sequential element of the first set receives either the external input signal or the asynchronous initialization signal by way of a combinational logic circuit. At step 310, the processor 106 places a binary value at the output terminal of each of the sequential elements of the first set that corresponds to a predefined initial state thereof. At step 312, the processor 106 defines or identifies the second set of sequential elements. Each sequential element of the second set receives the binary value from a corresponding sequential element of the first set. At step 314, the processor 106 determines present states of each of the sequential elements of the second set.

At step 316, the processor 106 defines the third set of sequential elements as a subset of the second set. Each sequential element of the third set has the determined present state matching a predefined initial state thereof. At step 318, the processor excludes the sequential elements that receive an initialization signal by way of a combinational logic circuit and the sequential elements that belong to an intersection of the first and second sets of sequential elements from the third set.

At step 320, the processor 106 replaces each sequential element of the third set with a sequential element that is configured to initialize synchronously. At step 322, the processor 106 decrements the COUNT by one. At step 324, a check is performed to determine if the COUNT equals zero. If at step 324 it is determined that the COUNT does not equal zero, at step 326, the processor 106 places a binary value corresponding to a predefined initial state at the output terminal of each of the sequential elements of the second set that receive a deterministic binary value at their corresponding data input terminals. Steps 312-322 are repeated thereafter. However, if at step 324 it is determined that the COUNT equals zero, the process is stopped.

Thus, the integrated circuit design 102 is modified by executing the steps 302-320. The modified integrated circuit design is used to fabricate an integrated circuit using known processes (i.e., the necessary design data files are sent to a fabrication facility and the integrated circuit is fabricated on a semiconductor wafer).

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. An electronic design automation (EDA) tool for modifying an initialization scheme of an integrated circuit design, wherein the integrated circuit design includes a plurality of sequential elements having predefined initial states, and wherein the sequential elements are initialized using an asynchronous initialization signal, the EDA tool comprising:
a memory that stores the integrated circuit design; and
a processor in communication with the memory, wherein the processor:
identifies a first set of sequential elements of the plurality of sequential elements, wherein each of the sequential elements of the first set receives at least one of an external input signal and the asynchronous initialization signal by way of a combinational logic circuit;
places a binary value at an output terminal of each of the sequential elements of the first set, wherein the binary value corresponds to a predefined initial state of the corresponding sequential element;
identifies a second set of sequential elements of the plurality of sequential elements, wherein at least one of the sequential elements of the second set receives the binary value from one of the sequential elements of the first set;
determines present states of each of the sequential elements of the second set;
identifies a third set of sequential elements from the second set of sequential elements, wherein for each sequential element of the third set, the determined present state matches a predefined initial state thereof;
replaces each sequential element of the third set with a sequential element that is configured to be initialized synchronously, thereby modifying the integrated circuit design; and
stores the modified integrated circuit design in the memory.

2. The EDA tool of claim 1, wherein the processor further places a binary value at an output terminal of each of the sequential elements of the second set that receives a deterministic binary value at corresponding data input terminal, wherein the binary value corresponds to a predefined initial state of the corresponding sequential element.

3. The EDA tool of claim 2, wherein the processor further identifies a fourth set of sequential elements of the plurality of sequential elements, wherein at least one of the sequential elements of the fourth set receives the binary value from a corresponding sequential element of the second set.

4. The EDA tool of claim 3, wherein the processor further determines present states of each of the sequential elements of the fourth set and selects a fifth set of sequential elements from the fourth set, wherein for each sequential element of the fifth set, the determined present state matches a predefined initial state thereof.

5. The EDA tool of claim 4, wherein the processor selects the first, second, third, fourth and fifth sets of sequential elements by excluding the sequential elements that have set and reset terminals, the sequential elements that are devoid of set and reset terminals, and the sequential elements that receive an internally generated initialization signal.

6. The EDA tool of claim 5, wherein the processor selects the third and fifth sets of sequential elements by further excluding sequential elements that receive an initialization signal by way of the combinational logic circuit.

7. The EDA tool of claim 1, wherein the processor selects the third set of sequential elements from the second set of sequential elements by excluding each sequential element that belongs to an intersection of the first and second sets of sequential elements.

8. The EDA tool of claim 1, wherein the predefined initial state includes at least one of a set and a reset state, the asynchronous initialization signal includes at least one of a set signal and a reset signal, and the external input signal is a data input signal received at a data input terminal of a sequential element of the first set, and wherein each of the sequential elements of the first set that receives the asynchronous initialization signal by way of the combinational logic circuit is initialized independently by the asynchronous initialization signal.

9. The EDA tool of claim 1, wherein each of the plurality of sequential elements includes at least one of a flip-flop and a latch.

10. The EDA tool of claim 1, wherein the processor modifies the initialization scheme of the integrated circuit design at a gate-level netlist.

11. A method for making an integrated circuit, comprising:
modifying an initialization scheme of an initial integrated circuit design using an electronic design automation (EDA) tool that includes a memory for storing the initial design and a processor that is in communication with the memory, wherein the initial design includes a plurality of sequential elements having predefined initial states, and wherein the sequential elements are initialized using an asynchronous initialization signal, wherein modifying the initial design comprises:
identifying a first set of sequential elements of the plurality of sequential elements, wherein each of the sequential elements of the first set receives at least one of an external input signal and the asynchronous initialization signal by way of a combinational logic circuit;
placing a binary value at an output terminal of each of the sequential elements of the first set, wherein the binary value corresponds to a predefined initial state of the corresponding sequential element;
identifying a second set of sequential elements of the plurality of sequential elements, wherein at least one of the sequential elements of the second set receives the binary value from one of the sequential elements of the first set;
determining present states of each of the sequential elements of the second set;
identifying a third set of sequential elements from the second set of sequential elements, wherein for each sequential element of the third set, the determined present state matches a predefined initial state thereof;
replacing each sequential element of the third set with a sequential element configured to be initialized synchronously, thereby modifying the initial design; and
saving the modified initial design in the memory; and
fabricating the integrated circuit using the modified initial design.

12. The method of claim 11, further comprising placing a binary value at an output terminal of each of the sequential elements of the second set that receives a deterministic binary value at a corresponding data input terminal, wherein the deterministic binary value corresponds to a predefined initial state of the corresponding sequential element.

13. The method of claim 12, further comprising defining a fourth set of sequential elements of the plurality of sequential elements, wherein at least one of the sequential elements of the fourth set receives the binary value from a corresponding sequential element of the second set.

14. The method of claim 13, further comprising determining present states of each of the sequential elements of the fourth set and defining a fifth set of sequential elements from the fourth set, wherein for each sequential element of the fifth set, the determined present state matches a predefined initial state thereof.

15. The method of claim 14, further comprising selecting the first, second, third, fourth and fifth sets of sequential elements by excluding the sequential elements that have set and reset terminals, the sequential elements that are devoid of set and reset terminals, and the sequential elements that receive an internally generated initialization signal.

16. The method of claim 15, further comprising selecting the third and fifth sets of sequential elements by further excluding sequential elements that receive an initialization signal generated by way of a the combinational logic circuit.

17. The method of claim 11, further comprising selecting the third set of sequential elements from the second set of sequential elements by excluding each sequential element that belongs to an intersection of the first and second sets of sequential elements.

18. The method of claim 11, wherein:
- the predefined initial state includes at least one of a set and a reset state;
- the asynchronous initialization signal includes at least one of a set signal and a reset signal;
- the external input signal is a data input signal received at a data input terminal of a sequential element of the first set; and
- each of the sequential elements of the first set that receives the asynchronous initialization signal by way of the combinational logic circuit is initialized independently by the asynchronous initialization signal.

19. The method of claim 11, wherein each of the plurality of sequential elements includes at least one of a flip-flop and a latch.

* * * * *